United States Patent

Finn et al.

(10) Patent No.: US 9,282,164 B2
(45) Date of Patent: Mar. 8, 2016

(54) APPLICATION HINTS FOR NETWORK ACTION

(71) Applicant: Cisco Technology, Inc., San Jose, CA (US)

(72) Inventors: Norman Finn, Livermore, CA (US); Bhushan Kanekar, Saratoga, CA (US); Ed Warnicke, Austin, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 388 days.

(21) Appl. No.: 13/844,249

(22) Filed: Mar. 15, 2013

(65) Prior Publication Data

US 2014/0280838 A1    Sep. 18, 2014

(51) Int. Cl.
*H04L 29/08*     (2006.01)
*H04L 12/931*    (2013.01)

(52) U.S. Cl.
CPC .............. *H04L 67/327* (2013.01); *H04L 49/00* (2013.01)

(58) Field of Classification Search
CPC .............................. H04L 67/327; H04L 49/00
USPC .......................................................... 709/223
See application file for complete search history.

(56) References Cited

U.S. PATENT DOCUMENTS

| | | | | |
|---|---|---|---|---|
| 6,615,358 B1* | 9/2003 | Dowd | ................. | H04L 63/0254 370/229 |
| 7,073,196 B1* | 7/2006 | Dowd | ................. | H04L 63/0263 370/395.52 |
| 2011/0055927 A1* | 3/2011 | Hamilton, II | ........... | G06F 3/011 726/26 |
| 2014/0019555 A1* | 1/2014 | Cai | ........................ | G06Q 50/01 709/205 |
| 2014/0050223 A1* | 2/2014 | Foo et al. | ....................... | 370/400 |
| 2014/0153443 A1* | 6/2014 | Carter et al. | ................... | 370/256 |
| 2014/0280838 A1* | 9/2014 | Finn | ...................... | H04L 67/327 709/223 |

OTHER PUBLICATIONS

Toward Software-Defined Cellular Networks, Li et al. Published in 2012 European Workshop on Software Defined Networking (EWSDN) by IEEE, Oct. 25-26, 2012, pp. 7-12.*

* cited by examiner

*Primary Examiner* — Backhean Tiv
(74) *Attorney, Agent, or Firm* — Patterson & Sheridan, LLP (57) ABSTRACT

A user application may provide a hint which may be used by a compute device to select a tag to be inserted into the packets generated by the user application. Upon some event, the application transmits a hint associated with a network flow generated by the user application to a stack associated with the computing device. One of the layers of the stack—e.g., the operating system in the computing device—may include a hint database that contains rules for selecting tags using a received hint as input. The layer may then insert the tag into one or more packets of the network flow. When processing the packet, network devices in the SDN enabled network recognize the tag and perform an action corresponding to the tag.

17 Claims, 7 Drawing Sheets

APPLICATION HINTS FOR NETWORK ACTION

TECHNICAL FIELD

Embodiments presented in this disclosure generally relate to selecting tags for a particular network flow, and more specifically, to using information provided by an application that generates the network flow as a hint for selecting the tag.

BACKGROUND

Software-defined networking (SDN) is an approach to networking in which control is decoupled from hardware and given to a software application, referred to herein as a SDN controller. Conventionally, when a packet arrives at a network device in a typical network, the control plane, which is based on the switch's proprietary firmware, tells the device where to forward the packet. In some network devices, the control plane may be configured to recognize different types of packets and treat them differently, such as forwarding the packets to different network devices or dropping the packets if certain criteria are met.

In a SDN enabled network, a network administrator can change how the network devices route data packets using the software application without having to, for example, send a technician to the individual network devices. The administrator can remotely reconfigure the rules in the control plane of the network devices—e.g., prioritizing, de-prioritizing or even blocking specific types of packets—using the SDN controller. A SDN enabled network may allow the administrator to manage traffic loads in a flexible and more efficient manner relative to conventional network devices that use control planes based on firmware.

Moreover, SDN allows a network administrator to configure a switching fabric across multi-vendor hardware and different proprietary firmware. One standard that permits a network administrator to remotely configure and control the control plane of network devices is the OpenFlow® standard (OpenFlow is a trademark of the Open Networking Foundation). Generally, OpenFlow lets network administrators control routing tables for a plurality of network devices using a single SDN controller.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

Description
Overview

Embodiments described herein include a method, a system and a computer program product for selecting a tag for use in a SDN environment. The method, system, and computer program product receive an attribute from a user application executing on a computing device, the attribute describing a network flow associated with the user application. The method, system, and computer program product comparing the attribute to one or more rules to select at least one tag for the network flow, where the selected tag is associated with a corresponding action to be performed in the SDN environment. The method, system, and computer program product insert the received tag into at least one packet in the network flow. After inserting the selected tag, the method, system, and computer program product transmit the at least one packet into the SDN environment, where at least one network device in the SDN environment is configured to recognize the tag in the at least one packet and perform the corresponding action.

Description of Example Embodiments

Software-defined networking (SDN), in general, provides additional flexibility and solidarity relative to conventional networks. Using an SDN controller, which may be either centrally located or located on the respective network devices, a network administrator can configure the control plane and dictate how the network device routes data. For example, the network administrator may assign criteria or rules that, when satisfied, instruct the network device to perform a specific action on the received packet—e.g., drop the packet, forward the packet to a particular network device, evaluate the packet using an application on the network device, and the like. In one embodiment, the SDN controller configures the routing table or forwarding table (i.e., forwarding information base) in a network device based on the network administrator's preferences.

After the packet has been generated by the user application, a network device in the SDN enabled network may evaluate the packet to determine what action to take. The network devices may rely on the different headers of the packet—e.g., source and destination addresses, security group tag, MAC-layer priority value, VLAN ID, etc.—to determine the action. Alternatively or additionally, the network device may perform a deep packet inspection to determine what action is appropriate. In one embodiment, the network administrator may prefer that the network devices only have to evaluate the packet headers or other superficial information to identify the action to perform which may require less time than a deep packet inspection. However, the headers may not be able to convey information to the network device that is useful when determining the action to perform such as the duration of the flow, the amount of data that will be transferred in the flow, certain contractual requirements related to the flow, and the like. Moreover, in some instances, even performing a deep packet inspection may not reveal the desired action. For example, if the network administrator guaranteed that a certain network flow generated by a user application will be routed on the least-latency path through the network, evaluating the headers or performing a deep packet inspection on the packet may not reveal the source application, and thus, the network device may not be able to identify the packets that should be routed along the least-latency path.

Instead, the user application may provide a hint which may be used by a tag controller to identify a tag that is inserted into the packets generated by the user application. In one embodiment, when the user application is executed on a computer device, the application transmits information (i.e., a hint) about its associated network flow via a stack associated with the computing device. One of the layers of the stack—e.g., the operating system or a virtual machine in the computing device—may be communicatively coupled to the tag controller. This layer may receive from the tag controller a hint database that includes information for selecting a tag based on a hint received from the user application. For example, the hint may identify the user application as a high-speed trading application that requires the path through the network with the least latency. Using the hint database, the layer may tag each packet generated by the trading application to a particular VLAN. Using an SDN controller, the network administrator may configure each network device such that the packets with the assigned VLAN tag traverse the network using the least latency path. In this manner, the network administrator uses the hint provided by the user application to select a tag which may be inserted into the packet which the network devices can easily evaluate to identify the appropriate action.

Because the tag controller provides the hint database to one of the layers in the stack, the network administrator may not need to directly monitor the user application. Instead, the layers in the stack may select the appropriate tag using the hint database and insert the tag into the network flow. Similarly, the programmer who developed the user application may not need to have knowledge about the underlying layout of the SDN enabled network. Instead, the programmer of the user application may provide a description of the hints to the network administrator which may then load the hint database onto the tag controller. The controller may then provide the database to one of the layers in the stack. Thus, the hint and the hint database are an indirect communication method by which the stack can select the appropriate tag for the network traffic that suits the configuration of the particular network.

Figure 1:
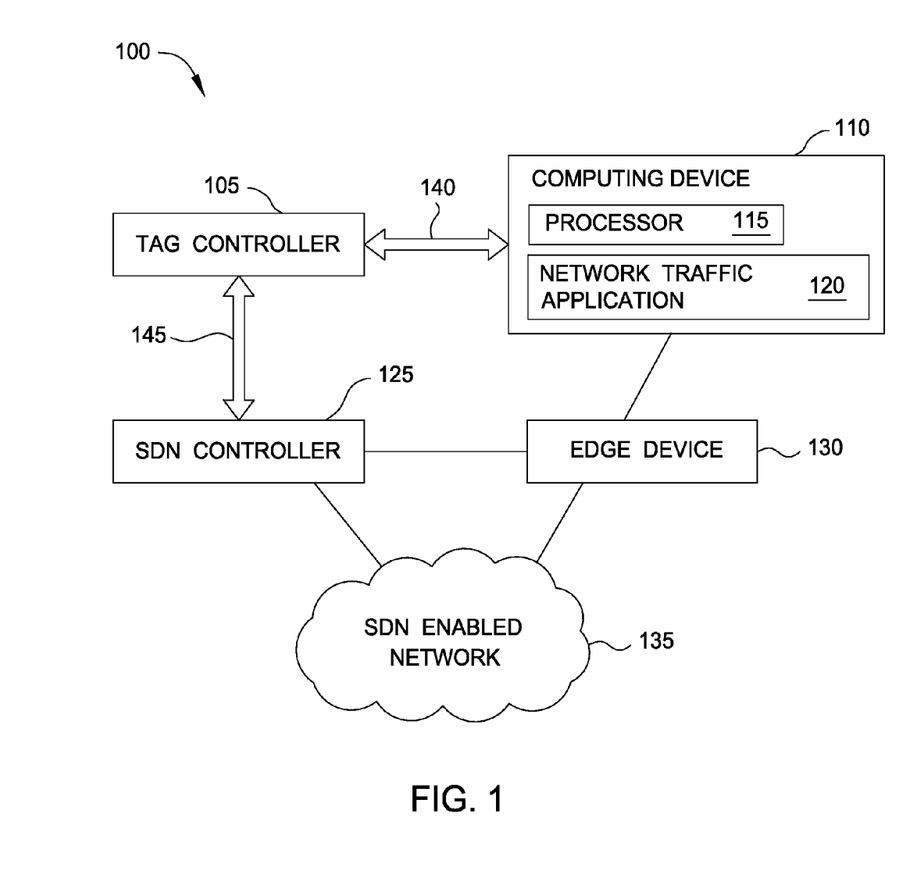
FIG. 1 illustrates a system for using information about a network traffic application to generate a tag for a SDN enabled network.

FIG. 1 illustrates a system 100 for using information provided by a network traffic application to generate a tag for a SDN enabled network. System 100 includes a tag controller 105, a computing device 110 that hosts a network traffic application 120 (e.g., a user application), a SDN controller 125, an edge device 130, and a SDN enabled network 135. The tag controller 105 may be an application executing on a computing device separate from the computing device 110 (e.g., a server connected to network 135). In one embodiment, the tag controller 105 may be accessible to a network administrator of network 135 while the network traffic application 120 is not. Accordingly, to aid the administrator and tag controller 105 when selecting an appropriate tag for the network flow (or flows) generated by the network traffic application 120, the tag controller 105 may transmit a hint database (not shown) to computing device 110 via the communication path 140. The user application 120 may provide information about the network flow—i.e., a hint—which the computing compares to the hint database to select the appropriate tag. In another embodiment, the computing device 110 may use communication path 140 to transmit the hint to tag controller 105. In this scenario, tag controller 105 may select the appropriate tag and transmit the tag back to computing device 110. The hint may define the duration of the network flow, the number of bytes likely to be transferred by the network flow, a description of the end points of the flow, an identity of the network traffic application 120, contractual obligations associated with the flow, and the like. In one embodiment, the network traffic application 120 may provide the hint before application 120 begins to generate network traffic—e.g., application 120 provides the hint when it is first executed in the computing device 110. Network traffic application 120 may provide a hint based on other predefined events, such as opening a remote connection, estimating a duration of a network flow or the amount of data a network flow will carry, receiving a query or request for data, and the like.

Communication path 140 may be any communication channel used to couple the computing device to the tag controller 105. For example, communication path 140 may include edge device 130 and network 135 which route the hint from the computing device 110 to the tag controller 105. Alternatively, computing device 110 may have a separate communication link that permits device 110 to directly receive the hint database from the tag controller 105.

Computing device 110 may be any computing structure such as a server, personal computer, database, and the like that uses on a processor 115 to execute one or more applications. Processor 115 represents any processor capable of performing the task discussed herein and may include multiple processors or processors with multiple cores. When executed by processor 115, the network traffic application 120 generates one or more network flows that traverse edge device 130 and the SDN enabled network 135 to one or more end points (not shown). That is, the network traffic application may be loaded into a memory associated with the computing device 110. Network traffic application 120 may be any type of user application, such as a web server application, database application, remote-storage application (e.g., cloud storage application), and the like.

As shown, computing device 110 is coupled to edge device 130 (e.g., a switch, router, bridge, or other network device) that provides access to network 135. The SDN enabled network 135 may include a plurality of network devices that route the network flow to one or more end points. In one embodiment, the SDN enabled network 135 includes network devices whose control planes are configurable by the SDN controller 125. Specifically, the network administrator may reconfigure the rules of the control planes using the SDN controller 125 in order to prioritize, de-prioritize or block specific types of packets.

In one embodiment, the SDN enabled network 135 may represent only the network devices whose control planes are configurable by the SDN controller 125. That is, network 135 may be connected to other network devices that are controlled by a different SDN application or network devices that are not SDN enabled. For example network 135 may be only a portion of a larger network, e.g., the Internet. In these scenarios, the network administrator may have permission to access and configure only a subset of the network devices used to transmit the network flow.

As shown, tag controller 105 and SDN controller 125 may be communicatively linked via path 145. Like path 140, communication path 145 may use the SDN enabled network 135 to transmit data between the controllers 105 and 125. Alternatively, controllers 105 and 125 may be applications executing on the same computing device. Generally, communication path 145 permits the controllers 105 and 125 to share information about network 135. For example, SDN controller 125 may provide information to the tag controller 105 about the particular configuration of the network 135. Based on this information, the tag controller 105 may update the hint database such that the hints provided by application 120 are matched to tags customized to the configuration of the SDN enabled network 135. In one embodiment, the SDN controller 125 and the SDN enabled network 135 may follow the OpenFlow® standard for configuring the rules used to route data in network 135.

Figure 2:
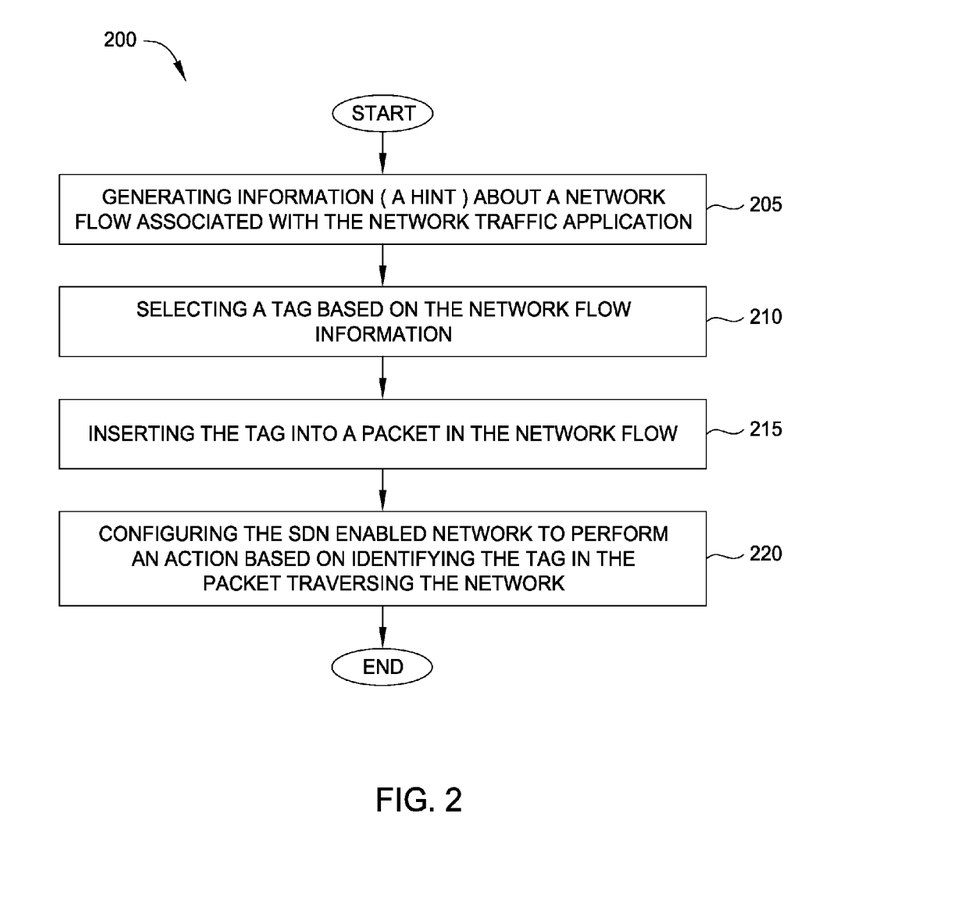
FIG. 2 illustrates a method for generating a tag for a SDN enabled network using information about a network traffic application.

FIG. 2 illustrates a method 200 for generating a tag for a SDN enabled network using information about a network traffic application. At block 205, the network traffic application generates information about a network flow (i.e., a hint). The hint may be either a standalone data chunk or be embedded within another data message or communication. In one embodiment, the hint may be separate from the network flow. For example, the hint may be transmitted from the network traffic application to an operating system executing on the host computing device as part of loading the network traffic application into memory.

At block 210, the computing device selects a tag based on the hint issued by the network traffic application. For example, the operating system on the computing device may have a hint database that includes a plurality of rules that use the hint as an input to select the appropriate tag. Moreover, in one embodiment the computing device may also consider information in the packets when selecting the tag. An example rule could be if TCP flow is to port 80 (which is gathered by evaluating packets of the network flow) and transfer size is less than five megabytes (which may be information gathered from the hint) then the appropriate tag is a MPLS label value of 2459. The different manner by which the hint may be transmitted from the network traffic application to the tag controller and how the hint database is transmitted from the tag controller to the computer device will be discussed in further detail below. Once the hint is received, the computing device evaluates the hint using the hint database to determine the appropriate tag for the network flow or flows associated with the hint. As mentioned previously, the hint may define the duration of the network flow, the number of bytes likely to be transferred by the network flow, a description of the end points of the flow, an identity of the network traffic application, contractual obligations associated with the flow, and the like. In one embodiment, the network traffic application may transmit the hint before generating any network traffic on the network flow. Alternatively, the network traffic application may provide the hint after starting to transmit packets in a network flow on the SDN enabled network.

In one embodiment, the computing device may transmit the hint to the tag controller. Using the tag controller, the network administrator may select the appropriate tag for a network flow. For example, the hint database may not include an appropriate tag for a received hint. Instead of not selecting a tag, the computing device may transmit the hint to the tag controller. The administrator may use a display screen communicatively linked to the tag controller to view the hint received from the network traffic application 120. For example, the hint may inform the network administrator that the network flow transmits high-priority information that needs to traverse the network quickly. In response, the network administrator may select a tag that assigns the packets in the network flow a high-priority. In this manner, the tag controller may select a tag using input from the network administrator. Moreover, the network administrator may then use the SDN controller to configure the SDN enabled network to route packets with the selected tag through the least-latency path.

In one embodiment, the network traffic application may generate a plurality of different network flows. Each of these network flows may be associated with a different hint and/or tag. In one embodiment, the network traffic application may provide a hint associated with each of the flows, and at block 210, the computing device may evaluate each of the hints independently and select a tag for each of the flows. The selected tags may be the same or different. For example, the network traffic application may generate two different network flows: one flow is dedicated to transmitting confidential data while the other flow is associated with data that is time sensitive. The computing device may assign two separate tags to the flows such that first flow uses a firewall when traversing the network while the second flow uses the least-latency path through the network. In another embodiment, the network traffic application may provide only one hint even if the application generates a plurality of different flows. Nonetheless, the computing device may use the single hint to issue multiple tags. For example, if the hint identifies the network traffic application as a web server, the hint database in the computing device may be preconfigured with multiple rules that consider attributes of the network flows (e.g., which ports the flows use). Using the rules, the computing device may select a tag for each of the network flows from the web server.

At block 215, the computing device or the network traffic application may insert the selected tag into the network flow. For example, the computing device or network traffic application may selectively insert the tag into only certain packets in the network flow or insert the tag into all the packets in the flow. Generally, the tag may be any value that, when inserted into a packet, is easily identifiable by a network device—i.e., a value that is found without performing a deep packet inspection. In one embodiment, the tag is inserted into a packet header. In this scenario, the tag may be a predefined value that allows a network device to distinguish the packet, and thus the network flow, from other packets and network flows. For example, the tag may be a particular value for a packet's multiprotocol label switching (MPLS) header, a security group tag, a service insertion tag, a differentiated services code point (DSCP) value, VLAN ID, and the like. As will be discussed below, the tag may be inserted into the packets of the network flow by different elements in the computing device—e.g., the tags may be inserted by the network traffic application, the operating system, or a virtual machine executing on the computing device.

At block 220, the network administrator may configure the SDN enabled network to perform an action based on identifying the tag in a packet received at a network device. Stated differently, the tag may cause a network device to perform a certain action. This action may include routing the packet to a particular network device, processing the packet using an application executing on the network device, manipulating the packet, discarding the packet, and the like. In one embodiment, the network device may include a table (e.g., a flow table) that matches the tag with the action the network device should perform. In one embodiment, the network device may remove the tag from the packet before forwarding the packet to a different network device.

In one embodiment, the network administrator may configure the network in response to the tag assigned to the network flow. For example, if the hint indicates that the network flow should pass through a firewall when traversing the SDN enabled network, the computing device may assign a tag that routes the packets of the network flow through a network device hosting the firewall. In turn, the network administrator may use a SDN controller to access the edge device connected to the computer device hosting the network traffic application. Specifically, the network administrator may change or update the routing rules (or control plane) of the edge device such that packets containing the tag are routed to the network device hosting the firewall. As the network traffic application begins to generate packets, the tags are inserted into the packets which are detected by the edge device. This device then routes the packets through the firewall. Thus, in this example, the network administrator may configure the SDN enabled network after receiving the hint from the user application—e.g., the network traffic application.

In another embodiment, the tag controller or the network administrator may generate the hint database based on the current configuration of the SDN enabled network. For example, the network may have been previously configured (i.e., before the hint was transmitted at block 210) such that all data packets assigned to a particular VLAN will use the least-latency data path to traverse the network. Based on this knowledge, the tag controller may put a rule in the hint database indicated that the network flow should be assigned the particular VLAN ID associated with the least-latency data path. Accordingly, in this example, the configuration of the SDN enabled network is considered before assigning the tag to the network flow or receiving the hint from the network traffic application. Furthermore, the network administrator may not reconfigure the SDN enabled network based on the received hint, but instead uses the current configuration of the network to select the appropriate tag for the network flow.

Regardless of whether the network administrator changes the network configuration after the application begins to transmit hints or not, the configuration of the network may nonetheless be used to suit the needs of the particular user application without the application's developer having any knowledge of the configuration of the network. Accordingly, the network traffic application does not need to be customized for a particular network configuration. Instead, by transmitting the hint, any SDN enabled network may provide a customized tag that causes the underlying network devices to perform an action corresponding to the particular configuration of the network.

Although method 200 discusses selecting a tag based on a hint associated with a particular network flow (e.g., a plurality of related data packets), the present disclosure is not limited to such. For example, in other embodiments, the computer device may select a tag on a per-packet basis. That is, the network traffic application may transmit a hint which the computer device uses to identify a tag for each packet individually.

Figure 3:
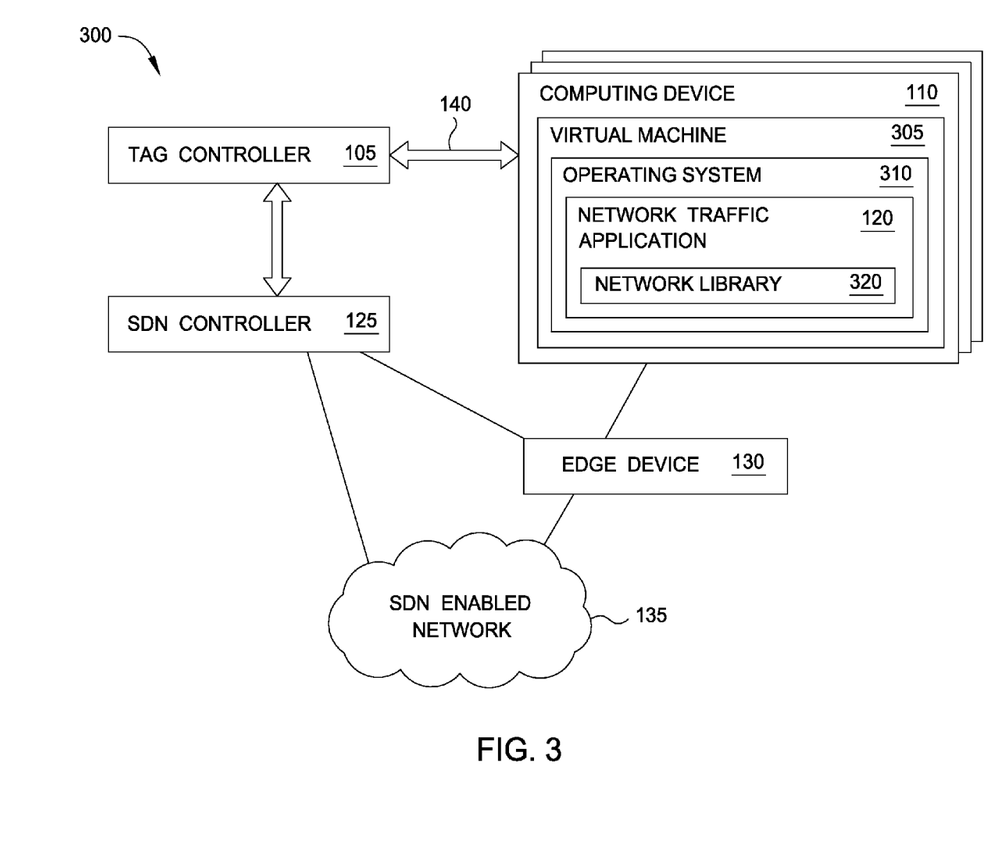
FIG. 3 illustrates a system for using information about a network application to generate a SDN tag using a hierarchical stack.

FIG. 3 illustrates a system 300 for using information about a network application to generate a SDN tag using a hierarchical stack. Specifically, system 300 includes one or more computing devices 110 that may host one or more virtual machines 305. In one embodiment, virtual machine 305 emulates the computer architecture and functions of a physical computing device. That is, virtual machine 305 may be a software implementation of a computing device that executes programs and applications like a physical machine. In this manner, the hardware resources of the computing device 110 may be divided into a plurality of virtual machines 305. Each virtual machine 305 may include one or more instantiations of an operating system 310 which may be used to execute the network traffic application 120. Operating system 310 may be any operating system capable of performing the functions described herein.

Network traffic application 120 includes a network library 320 which may contain the library routines for the application 120. In one embodiment, the network library 320 may be a sockets library. When the network traffic application 120 first is loaded into memory, opens a disk file, opens a remote connection, or registers to accept incoming connections, the application 120 may supply a chunk of data (i.e., the hint) to another element in the computing device 110. As mentioned previously, the hint may be a connection type, an estimated length of connection in both total data transfer and time, a characterization of the bandwidth required, and an indication of the reliability of these estimates. For example, when opening a TCP connection, the hint may be transmitted to the network library 320 which then passes the hint to operating system 310, but when opening a disk file, the hint may provided directly to operating system 310, thereby skipping network library 320.

The other elements shown in FIG. 3—e.g., controllers 105 and 125, network 135, and edge device 130—may perform a similar function as that described in FIG. 1. However, in one embodiment, edge device 130 may be virtualized and hosted within computing device 110.

Figure 4:
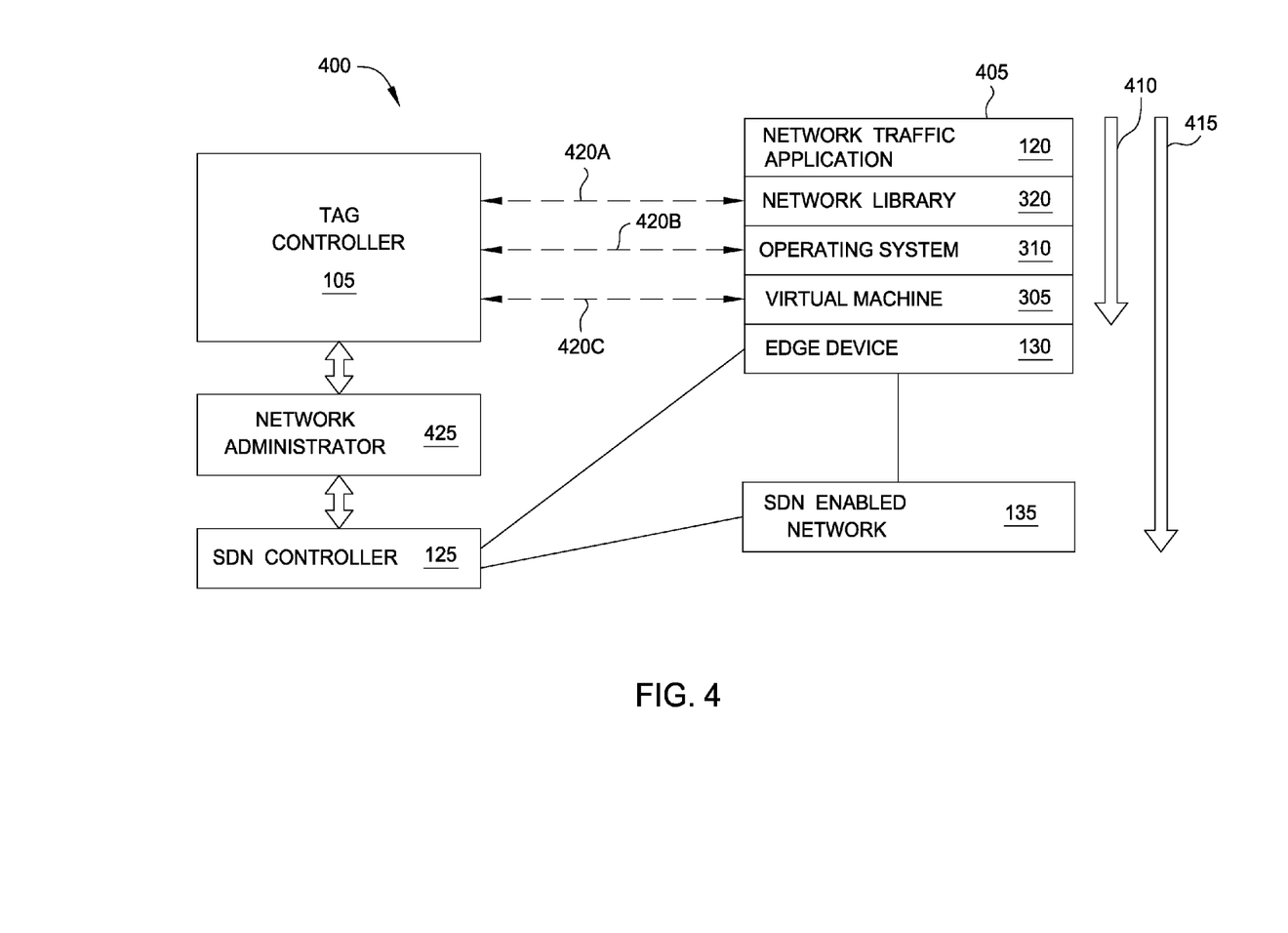
FIG. 4 illustrates a stack that uses information about the network application to generate a SDN tag.

FIG. 4 illustrates a system 400 that uses information about the network application to generate a SDN tag. Specifically, system 400 includes a stack 405 through which the network flow and the hint generated by the network traffic application 120 may traverse. Specifically, arrow 410 illustrates the path the hint may travel in stack 405 while arrow 415 illustrates the flow of network traffic from the application 120 to the SDN enabled network 135.

Dotted lines 420A-C illustrate possible communication links between the different layers in stack 405 and the tag controller 105. In one embodiment, at least one of the layers of stack 405 is communicatively coupled to the tag controller 105. For example, the operating system 310 may be configured to communicate with the tag controller 105 (i.e., path 420B is used) while the network library 320 and the virtual machine 305 are not. However, in other embodiments multiple layers of stack 405 may be communicatively coupled to tag controller 105 via lines 420A-C. Although lines 420A-C are illustrated as being separate from network 135, in one embodiment, the network library 320, operating system 310, or virtual machine 305 may communicate with tag controller 105 via the network 135. That is, the layer of stack 405 that is configured to communicate with the tag controller 105 may receive the hint database from the controller 105 through the SDN enabled network 135 and edge device 130. Alternatively, the computing device may provide a separate communication link for transmitting the hint database from tag controller 105 one of the layers in stack 405.

In one embodiment, the hint may be a data chunk ranging from, for example, one or more bits to twenty bytes of information. In one embodiment, the hint may be transmitted using I/O control in the virtual machine 305. The hint may be embedded into other data communications transferred between the layers in stack 405. For example, when detecting a remote connection, the application 120 may embed the hint in the I/O control data that flows between the different layers of stack 405. Even if one of the layers is not configured to process the hint (i.e., the layer does not have a hint database), the layer may pass the embedded hint to a lower layer which does have the hint database. For example, assuming that the operating system 310 is not configured to communicate with the tag controller 105 to receive the hint database but the virtual machine 305 is, once the operating system 310 receives the hint, the operating system 310 may simply pass the hint to the lower layer—i.e., the virtual machine 305—which recognizes the hint and selects the appropriate tag using the database. In this manner, the different layers of stack 405 do not need to be configured to recognize or process the hint.

Although path 410 illustrates that the hint traverses through the network library 320, operating system 310, and virtual machine 305, this is not a requirement—i.e., the hint may pass through only one or two of the layers. For example, if the network library 320 is configured to process the hint, then the hint may not need to be passed on to the lower levels of stack 405. If the hint is embedded in other data communication (e.g., I/O control), then the hint may "piggy-back" on that data until the hint reaches the layer with a hint database. That layer may, if desired, remove the hint from the carrier data communication before passing the data to a lower level. Thus, in one embodiment, the hint may traverse stack 405 until the hint reaches the layer that selects the tag.

Moreover, the hint may skip over one or more of the layers 405 when traversing the stack 405. For example, in some instances (e.g., when opening a disk file), the application 120 may provide the hint directly to operating system 310 and skip network library 320.

System 400 also illustrates that a network administrator 425 may influence which tag is selected as well as configure the network 135 using SDN controller 125. As mentioned previously, the network administrator 425 may use tag controller 105 to select a particular tag or re-configure the control planes of the network devices in network 135 to perform a certain action when detecting the tag in a packet. However, in other embodiments, the techniques discussed herein may be performed without any input from the network administrator 425.

Figure 5:
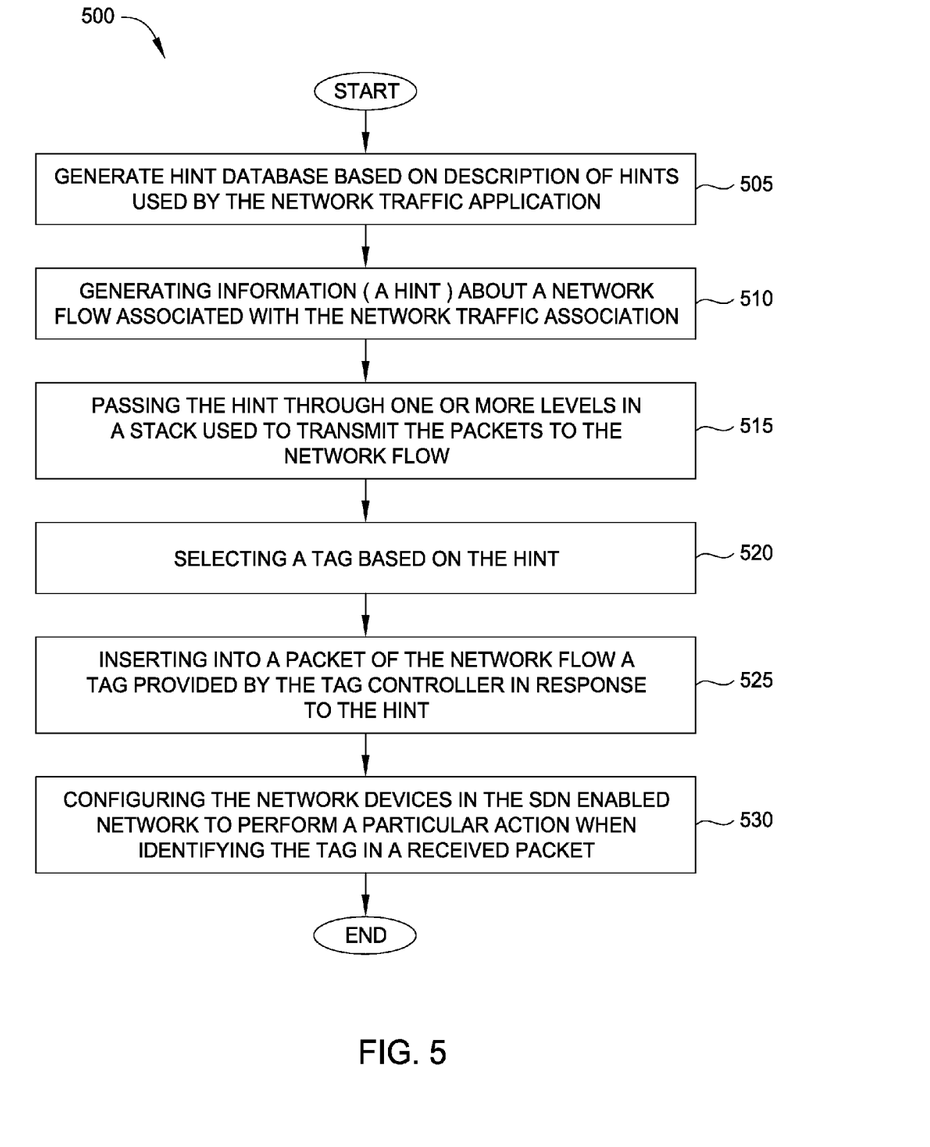
FIG. 5 illustrates a method for using information about a network application to generate a SDN tag using a hierarchical stack.

FIG. 5 illustrates a method 500 for using information about a network application to generate a SDN tag using a hierarchical stack. At block 505, the tag controller may receive a description of the hints used by a network traffic application. In one embodiment, the programmer who develops the network traffic application may publish a description of the various hints the application may provide. A network administrator may access the list and upload it to the tag controller. Alternatively, the tag controller may periodically access, e.g., a central data store to retrieve descriptions of hints user applications may provide. These descriptions may be used to decode a hint transmitted by the network traffic controller to the tag controller. More specifically, the network administrator or tag controller may use the hint descriptions to generate the rules for the hint database. For example, the network traffic application may use a predefined bit value as a hint to indicate that the network flow is expected to be less than a gigabyte (e.g., "0"), while the bit value "1" indicates that the data flow is expected to be greater than a gigabyte. The tag controller may use the description to decode and interpret the hint received from the application to generate one or more rules for assigning a tag based on this hint. In this manner, a programmer may use any code when transmitting a hint and then provide the description of the code to the tag controller using a different communication method—e.g., publishing the description of the hint on a data repository that is accessible to the tag controller or the network administrator. Doing so may reduce the size of the data hint—e.g., the hint may range from one bit to twenty bytes. Once the hint descriptions are generated into rules and placed in the hint database, the tag controller may transmit the hint database to one of the layers in the stack.

In one embodiment, the tag controller may receive the description of the hint before receiving the hint from the network traffic application. For example, the tag controller may periodically download the description of the hints from a central repository or the network administrator may selectively load descriptions of hints into the tag controller based on the type of user applications the network administrator knows will use the SDN enabled network. In one embodiment, the tag controller of network administrator may retrieve the description of the hints after receiving the hint from the network traffic application. The tag controller may receive a coded hint, and if the controller cannot match the hint to a rule in the hint database, the tag controller may attempt to download the description from, for example, the central repository and transmit an updated hint database to one of the layers in the stack which can decode the hint and select the appropriate tag.

In other embodiments, however, the hint may not need a description. That is, the hint provided by the network traffic application may include a description that explains what the hint is. For example, the hint may be the identity of a user that opened a remote connection or the estimated duration of a network flow. In these scenarios, the hint may be larger than the coded hints discussed above but this may enable method 500 to skip block 505. In other words, the hint may be designed such that the computing device can use the hint to select a tag using, for example, a generic version of the hint database without receiving any supplemental description of the hint.

At block 510, the network traffic application may issue a hint associated with one or more network flows generated by the application. As shown in FIG. 4, the network traffic application may issue the hint along a similar data path (e.g., stack 405) as the packets associated with the network flow. In one embodiment, the network traffic application may determine the hint to issue based on an event occurring at the network traffic application. That is, the network traffic application may issue a plurality of different hints that each correspond to a different event. Non-limiting examples of these events include the application first being executed, opening a remote connection, estimating a duration of a network flow or the amount of data a network flow will carry, receiving a query or request for data, and the like. In response to the event, the network traffic application may select a particular hint (or hints). For example, if network traffic application receives a request to transmit a particular table in a database to a user, the application may issue one hint that identifies the user making the request and a second hint providing an estimated duration of the network flow in order to satisfy the query. The network traffic application may issue these hints simultaneously or sequentially.

At block 515, the hint issued by the network traffic application passes through at least one layer in the stack 405 shown in FIG. 4. In one embodiment, the hint or hints may pass through the stack sequentially—e.g., through the network library (e.g., a socket library), operating system, and virtual environment. Alternatively, the hint may pass through only a subset of these layers or may skip layers as the hint traverses the stack. Further still, the hint may pass through the stack only until the hint reaches the layer that is communicatively linked to the tag controller and contains the hint database. If, for example, the hint is embedded in a different data communication, the layer that selects the tag may remove the hint before passing the data communication to a lower level in the stack. In one embodiment, even if a layer of the stack is not tasked with transmitting the hint to the tag controller, the layer may change or amend the hint before passing the hint to a lower level.

In one embodiment, one of the layers in the stack (e.g., a virtual switch or the edge device) may have a flow table (e.g., a superset of the OpenFlow flow table) which may include mask-and-match rules for the SDN enabled network. Specifically, the flow tables may identify a tag or marker that indicates to a SDN enabled network device to take a corresponding action. Actions may include forwarding packets with the tag or marker out a certain port, adding or removing an encapsulation, forwarding through a tunnel to another part of the network, and the like. The SDN controller may publish these rules on the various network devices in the SDN enabled network or even on a virtual switch located in computing device 110 shown in FIG. 1.

At block 520, the layer of the stack with the hint database selects the appropriate tag for the network flow. For example, the operating system on the computing device may identify the hint and select the tag. As mentioned previously, the hint may define the duration of the network flow, the number of bytes likely to be transferred by the network flow, a description of the end points of the flow, an identity of the network traffic application, contractual obligations associated with the flow, and the like. In one embodiment, the network traffic application transmits the hint before generating any network traffic. Alternatively, the network traffic application may provide the hint after starting to transmit a network flow on the SDN enabled network.

In one embodiment, the layer with the hint database may transmit the hint to the tag controller. This may occur, for example, if the hint database does not have a rule matching the hint. Alternatively, instead of storing a local copy of the hint database in the layers of the computing device, the layer may transmit each hint to the tag controller which selects the tag using the database. The tag controller may then transmit the tag back to the layer which can insert the tag into the network flow.

In one embodiment, the network traffic application may generate a plurality of different network flows. Each of these network flows may be associated with a different hint and/or tag. Or the network traffic application may generate a plurality of hints for a single network flow. At block 520, the computing device may evaluate each of the hints independently and select a tag for each of the flows. These tags may be the same or different. In another embodiment, the network traffic application may provide only one hint even if the application generates a plurality of different flows. Nonetheless, the computing device may use the single hint to select multiple tags or select multiple tags for a network flow. Furthermore, if the network traffic application issues multiples hints for a single network flow, the computing device may select a tag for each of the hints.

At block 525, the layer that selects the tag may insert the tag into the network flow. For example, the layer may selectively insert the tag (or tags) into a subset of the packets in the network flow or insert the tag into all the packets in the associated network flow. As mentioned previously, the tag may be any value that, when inserted into a packet, is easily identifiable by a network device—i.e., a value that network device can identify without performing a deep packet inspection.

At block 530, the network administrator may configure the SDN enabled network to perform an action based on identifying the tag in a packet received at a network device. Stated differently, the tag may cause a network device to perform a certain action. This action may include routing the packet to a particular network device, processing the packet using an application executing on the network device, manipulating the packet, discarding the packet, and the like. In one embodiment, the network device may include a table that matches the tag to the corresponding action the network device should perform. In other embodiments, the network device may remove the tag from the packet before forwarding the packet to a different network device.

In one embodiment, the network administrator may configure the network in response to the tag assigned to the network flow using, for example, the SDN controller whose function was discussed previously. Specifically, the network administrator may change or update the routing rules (or control plane) of the edge device such that packets which include the tag are routed to a network device hosting the firewall. As the network traffic application begins to generate packets, the tags are inserted into the packets and the edge device detects the tags and routes the packets accordingly. Thus, in this example, the network administrator may configure the SDN enabled network after receiving the hint from the user application—e.g., the network traffic application.

In another embodiment, the tag controller or the network administrator may base the tag selection on the current configuration of the SDN enabled network. That is, the network administrator may not reconfigure the SDN enabled network based on the received hint, but instead uses the current configuration of the network to select and appropriate tag and action for the network flow.

Regardless of whether the network administrator changes the network configuration after the hint is received or not, the configuration of the network may nonetheless be used to suit the needs of the particular user application without the application's developer having any knowledge of the configuration of network. Accordingly, the network traffic application does not need to be customized for a particular network configuration. Instead, by transmitting the hint, any SDN enabled network may provide a customized tag that causes the underlying network devices to perform an action corresponding to the particular configuration of the network.

Although method 500 discusses selecting a tag based on a hint for a particular network flow (e.g., a plurality of related data packets), the present disclosure is not limited to such. For example, in other embodiments, the computing device may select a tag on a per-packet basis. That is, the network traffic application may transmit a hint which the computing device uses to identify a tag for each packet individually.

Figure 6A:
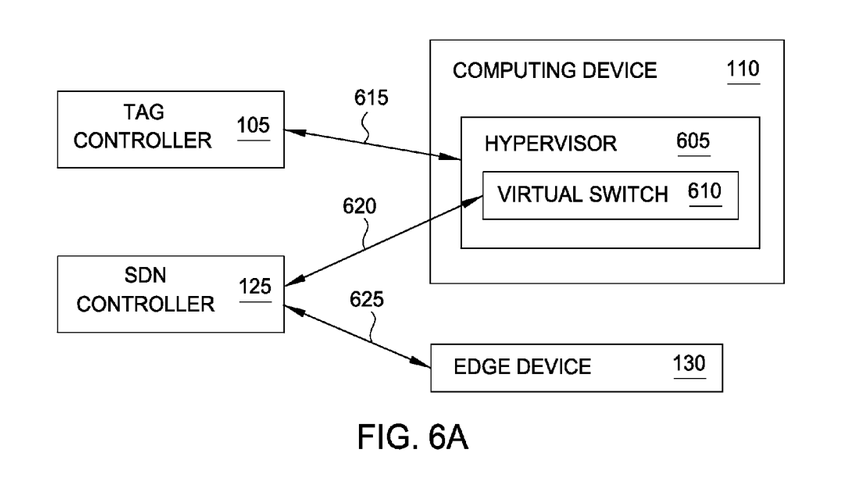
FIGS. 6A-6C illustrate initiating a stack for selecting a tag based on received hints, according to embodiments described herein.
Figure 6B:
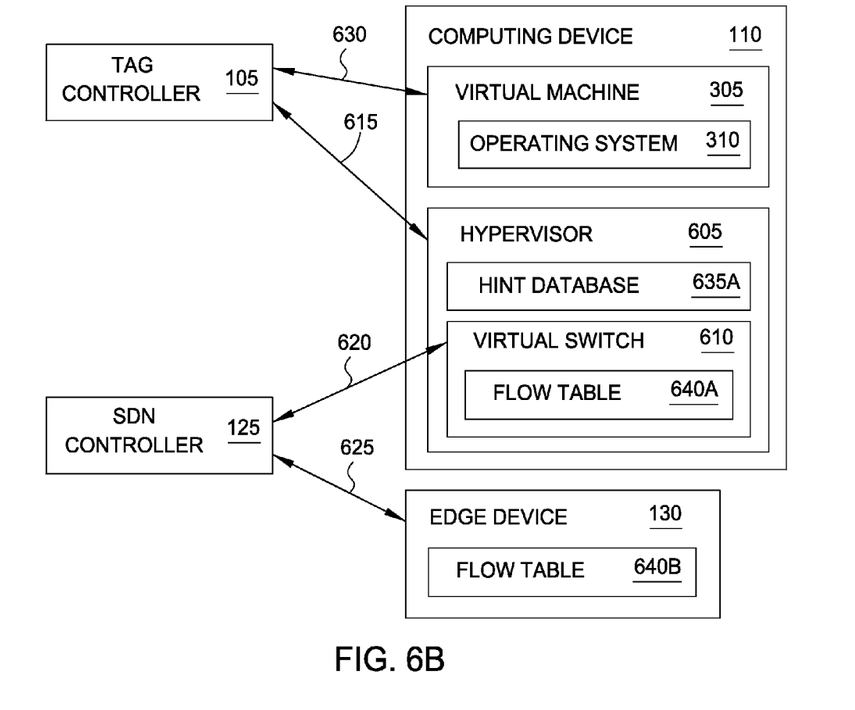
Figure 6C:
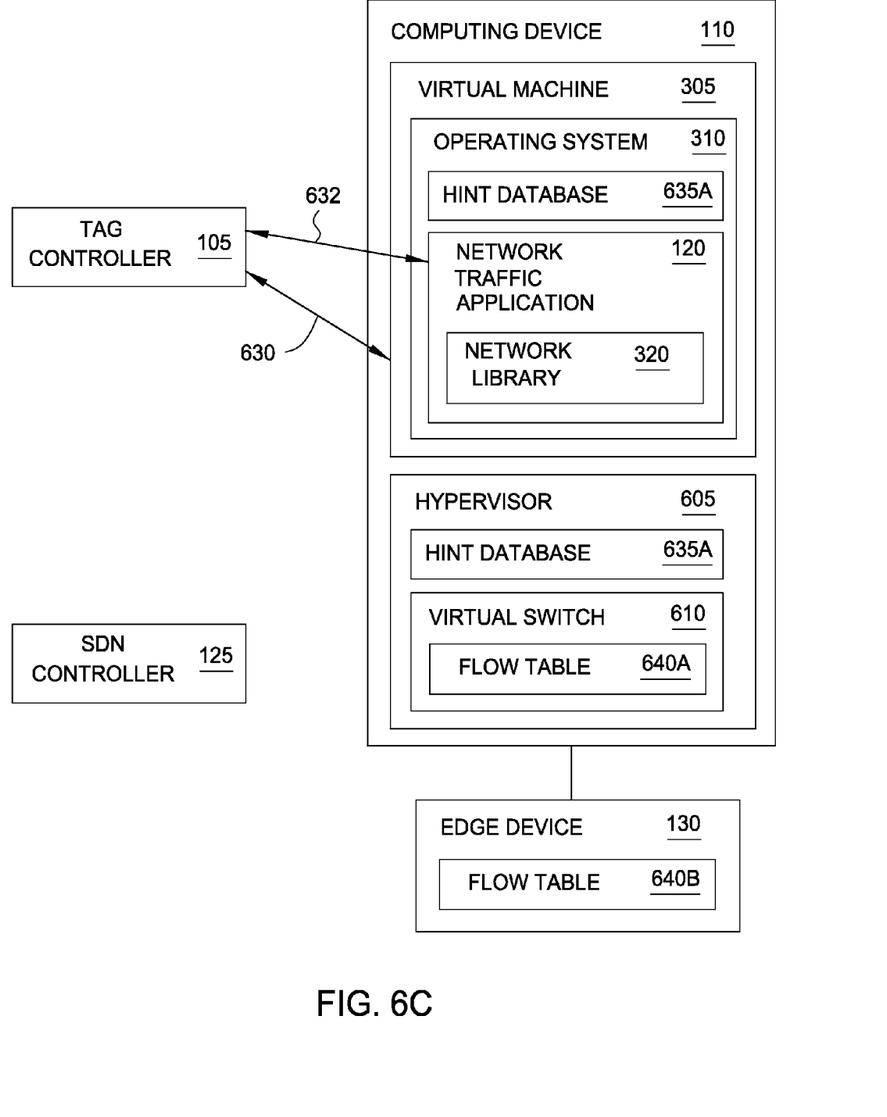

FIGS. 6A-6C illustrate initiating a stack for selecting a tag based on received hints, according to embodiments described herein. That is, FIGS. 6A-6C may occur before a hint is issued by a user application. Specifically, FIG. 6A illustrates a system before a virtual machine is initialized in the computing device 110. The computing device 110 includes a hypervisor 605 which may be a portion of software or firmware that creates and manages virtual machines. Here, hypervisor 605 includes a virtual switch 610, but in other embodiments, the virtual switch 610 may not used. The hypervisor 605 may establish communication links 615 and 620 with tag controller 105 and SDN controller 125, respectively. As will be discussed below, communication link 615 may enable the hypervisor 605 to establish a communication link between the tag control 105 and other elements in the computing device 110.

The SDN controller 125 may also establish a communication link 625 to edge device 130 as well as the communication link 620 to the virtual switch 610. Through these links, the SDN controller may establish SDN rules for interpreting tags inserted in received packets. Although two links are shown, in one embodiment, the SDN controller 125 may be communicatively coupled to only one of the links.

In FIG. 6B, hypervisor 605 loads virtual machine 305 into the memory of computing device 110 and begins to execute the operating system 310. Using communication link 615, hypervisor 605 may inform tag controller 105 about virtual machine 305 (or vice versa). Accordingly, tag controller 105 or virtual machine 305 may establish communication link 630 which enables tag controller 105 to pass data (e.g., a hint database) to the virtual machine 305 and/or the operating system 310.

In one embodiment, tag controller 105 may use communication link 615 to load a hint database 635A into the hypervisor 605. As discussed previously, the hint database 635A may be located in multiple layers in the stack or at only select layers and may be used by the layer to select a tag to insert into one or more packets of a network flow based on a hint provided by a user application (e.g., the network traffic application).

In addition, the SDN controller 125 may use communication links 620 and 625 to load flow tables into 640A-B. In one embodiment, SDN controller 125 may load the flow table 640 into one of the networking elements instead of both as shown here. The flow tables 640A-B may include mask-and-match rules (e.g., SDN rules) for the SDN enabled network. Specifically, the flow tables may identify a tag or marker that indicates to a SDN enabled network device to take a corresponding action. Thus, if the layers above the virtual switch 610 and edge device 130 insert a tag into a packet, the flow tables 640A-B enable the network elements to identify the tags and determine the corresponding action to perform.

In FIG. 6C, operating system 310 may load the network traffic application 120 into memory. Here, the operating system 310 may provide application information to tag controller 105. In one embodiment, this application information may be the hint discussed previously. To interpret the hint, tag controller 105 may provide the operating system 310 or virtual machine 305 with a hint database 635B. Moreover, in one embodiment, the tag controller 105 may update the hint databases 635A-B if the tag controller 105 learns more about the hints issued by the network traffic application 120.

In one embodiment, network traffic application 120 may continue to transmit hints to the elements in computing device 110. That is, instead of receiving only one hint from the network traffic application 120 once the application is first loaded into memory, application 120 may issue new hints based on other events such as establishing a new network connection, receiving a user request, or estimating a duration or total data transfer amount of the network flow.

Tag controller 105 may also establish a communication link 632 with the network traffic application 120. Although not shown, tag controller 105 may use this link 632 to load a local copy of the hint database into the network library 320 as discussed above. In this manner, any of the elements (or layers) in computing device 110 (e.g., virtual machine 305, operating system 310, network library 320, or hypervisor 605) may be configured to be in communication with tag controller 105. Using these links, the tag controller 105 may provide updates the hint databases 635.

As will be appreciated by one skilled in the art, embodiments may be embodied as a system, method or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for selecting a tag for use in a software-defined networking (SDN) environment, the method comprising:
receiving an attribute describing a network flow from a user application executing on a computing device, wherein the computing device includes a hierarchical stack comprising a plurality of layers through which packets of the network flow traverse before being transmitted into the SDN environment;
transmitting the attribute from the user application to at least one layer of the hierarchical stack, wherein the at least one layer stores a hint database of one or more rules to select at least one tag;
comparing the attribute to the hint database to select at least one tag for the network flow, wherein the selected tag is associated with a corresponding action to be performed in the SDN environment;
inserting the received tag into at least one packet in the network flow; and
after inserting the received tag, transmitting the at least one packet into the SDN environment, wherein at least one network device in the SDN environment is configured to recognize the tag in the at least one packet and perform the corresponding action.

2. The method of claim 1, wherein the at least one layer is one of: a network library associated with the user application, an operating system executing on the computing device, and a virtual machine executing on the computing device.

3. The method of claim 1, wherein the at least one layer receives the one or more rules from a tag controller associated with the SDN environment and inserts the selected tag into the at least one packet in the network flow as the at least one packet traverses the hierarchical stack.

4. The method of claim 3, wherein, before the attribute is transmitted by the user application, the tag controller uses a description associated with the attribute to generate the one or more rules stored in the hint database for evaluating the received attribute.

5. The method of claim 1, wherein the attribute is embedded into a separate data communication that traverses the heirarchical stack, wherein the attribute traverses the stack in the separate data communication until the attribute arrives at one of the plurality of layers that contains the hint database.

6. The method of claim 1, wherein the attribute is selected from a plurality of attributes based on an event occurring at the user application, wherein the event is at least one of: the user application beginning to execute, establishing a remote connection, receiving a user request, and estimating a duration or total data transfer amount of the network flow.

7. A computer-readable non-transitory storage medium for selecting a tag for use in a SDN environment, the computer-readable non-transitory storage medium comprising:
    computer code that executes a user application on a computing device, the computing device comprises a hierarchical stack comprising a plurality of layers through which packets of the network flow traverse before being transmitted into the SDN environment;
    computer code that receives an attribute from a user application, the attribute describing a network flow associated with the user application;
    computer code that transmits the attribute from the user application to at least one layer of the hierarchical stack, wherein at least one layer stores a hint database of one or more rules to select at least one tag;
    computer code that compares the attribute to the hint database to select at least one tag for the network flow, wherein the selected tag is associated with a corresponding action to be performed in the SDN environment;
    computer code that inserts the received tag into at least one packet in the network flow; and
    computer code that, after inserting the received tag, transmits the at least one packet into the SDN environment, wherein at least one network device in the SDN environment is configured to recognize the tag in the at least one packet and perform the corresponding action.

8. The computer program product of claim 7, wherein the at least one layer is one of: a network library associated with the user application, an operating system executing on the computing device, and a virtual machine executing on the computing device.

9. The computer program product of claim 7, wherein the at least one layer receives the one or more rules from a tag controller associated with the SDN environment and inserts the selected tag into the at least one packet in the network flow as the at least one packet traverses the hiearchical stack.

10. The computer program product of claim 9, wherein, before the attribute is transmitted by the user application, the tag controller uses a description associated with the attribute to generate the one or more rules stored in the hint database for evaluating the received attribute.

11. The computer program product of claim 7, wherein the attribute is embedded into a separate data communication that traverses the heirarchical stack, wherein the attribute traverses the stack in the separate data communication until the attribute arrives at one of the plurality of layers that contains the hint database.

12. The computer program product of claim 7, wherein the attribute is selected from a plurality of attributes based on an event occurring at the user application, wherein the event is at least one of: the user application beginning to execute, establishing a remote connection, receiving a user request, and estimating a duration or total data transfer amount of the network flow.

13. A system comprising:
    a computer processor; and
    a memory containing a program that, when executed on the computer processor, performs an operation for selecting a tag for use in a SDN environment, the operation comprising:
        executing a user application on a computing device, the computing device comprises a hierarchical stack comprising a plurality of layers through which packets of the network flow traverse before being transmitted into the SDN environment;
        receiving an attribute from the user application, the attribute describing a network flow associated with the user application;
        transmitting the attribute from the user application to at least one layer of the hierarchical stack, wherein the at least one layer stores a hint database of one or more rules to select at least one tag;
        comparing the attribute to the hint database to select at least one tag for the network flow, wherein the selected tag is associated with a corresponding action to be performed in the SDN environment;
    inserting the received tag into at least one packet in the network flow; and
        after inserting the received tag, transmitting the at least one packet into the SDN environment, wherein at least one network device in the SDN environment is configured to recognize the tag in the at least one packet and perform the corresponding action.

14. The system of claim 13, wherein the at least one layer is one of: a network library associated with the user application, an operating system executing on the computing device, and a virtual machine executing on the computing device.

15. The system of claim 13, wherein the attribute is embedded into a separate data communication that traverses the heirarchical stack, wherein the attribute traverses the stack in the separate data communication until the attribute arrives at the at least one layer that contains the hint database.

16. The system of claim 13, wherein the attribute is selected from a plurality of attributes based on an event occurring at the user application, wherein the event is at least one of: the user application beginning to execute, establishing a remote connection, receiving a user request, and estimating a duration or total data transfer amount of the network flow.

17. The system of claim 13, wherein the at least one layer receives the one or more rules from a tag controller associated with the SDN environment and inserts the selected tag into the at least one packet in the network flow as the at least one packet traverses the hiearchical stack.

* * * * *